March 3, 1959  J. R. MRLIK ET AL  2,875,856
PARKING LOCK FOR TRANSMISSION
Filed March 12, 1956  2 Sheets-Sheet 1
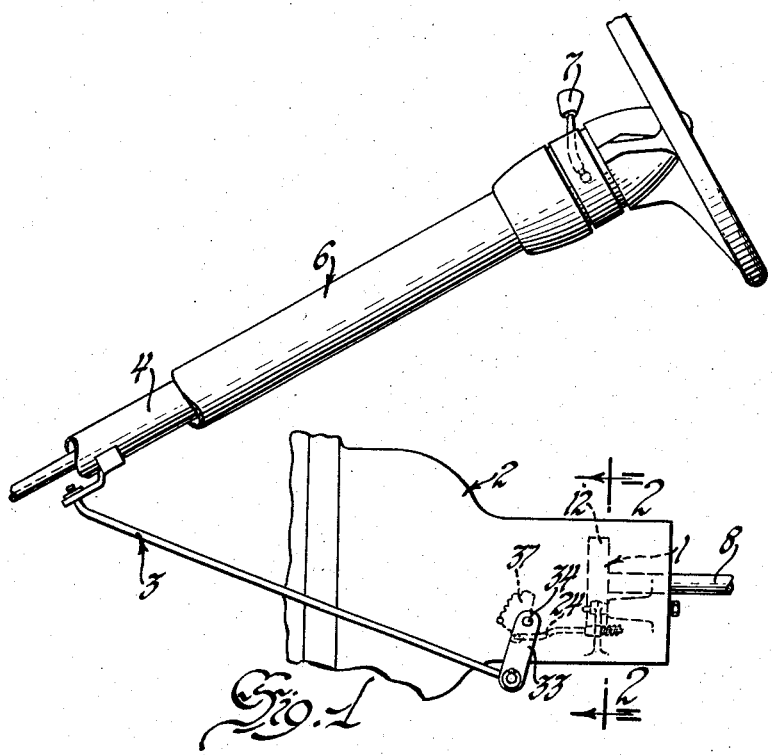
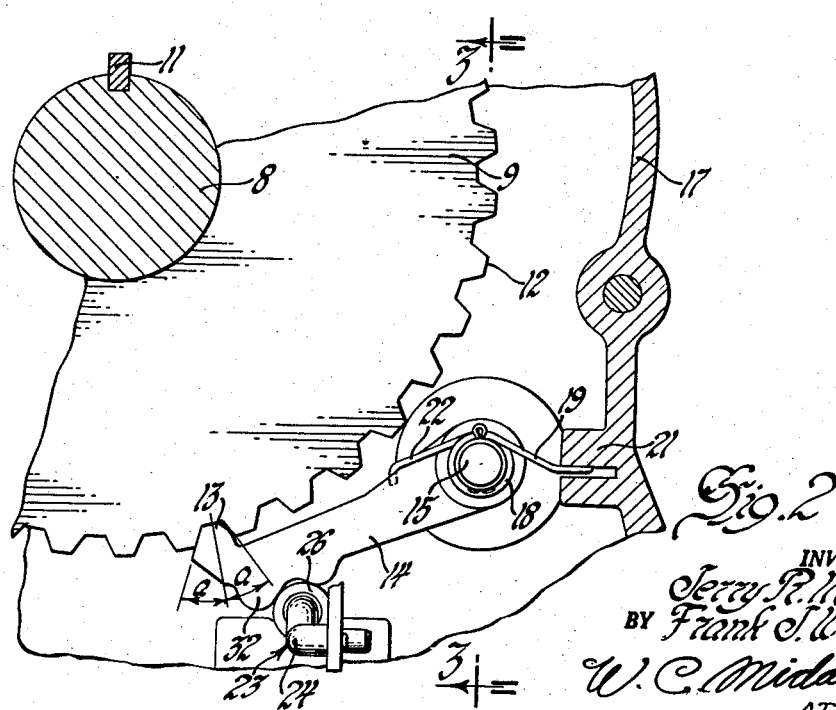
INVENTORS
Jerry R. Mrlik &
BY Frank J. Winchell
W. C. Middleton
ATTORNEY

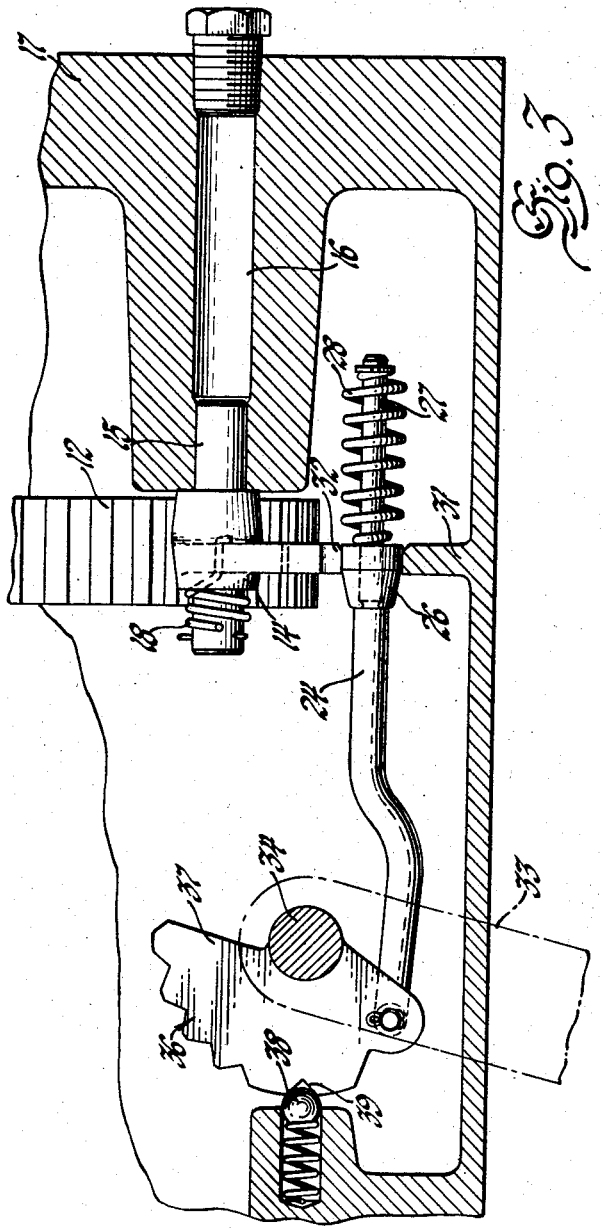

United States Patent Office 2,875,856
Patented Mar. 3, 1959

2,875,856

PARKING LOCK FOR TRANSMISSION

Jerry R. Mrlik, Oak Park, and Frank J. Winchell, Franklin Village, Mich., assignors to General Motors Corporation, Detroit, Mich., a corporation of Delaware Application March 12, 1956, Serial No. 570,855

3 Claims. (Cl. 188—69)

This invention relates generally to brakes and particularly to parking brakes for motor vehicles.

In a positive type parking brake commonly used with automatic transmissions, there is always the problem of proper engagement and disengagement under all conditions. For example, when interengaging tooth surfaces or other type locking surfaces are relied on to prevent relative movement between locked and locking members of a positive brake, the surfaces must be freely disengageable manually by a selector lever and control linkage even though the engaging surfaces are held tightly together by an extreme force such as that which occurs when the brake is holding a vehicle parked on a hill. Although the surfaces must be easily disengageable, they still must remain engaged, when desired, to provide the primary function of a brake for restraining vehicle movement.

The present invention contemplates as one of the main objects the provision of a parking brake that is easily disengageable at all times and that, when engaged, will positively prevent vehicle movement.

Also, the invention proposes a parking brake that, when preconditioned for release, will be inherently disengageable by any force on the vehicle wheels, that, also when preconditioned for release, normally remains disengaged, and that will be yieldably engageable by an operator.

Another object is the provision of cam means that are positively disengageable from a locking position in which the brake is engaged.

The foregoing and other objects and advantages of the invention will be apparent from the following description and from the accompanying drawings in which:

Fig. 1 is a side view of an embodiment of the invention;

Fig. 2 is a partial section along lines 2—2 showing the parking brake mechanism;

Fig. 3 is a partial section along lines 3—3 showing a cam for holding the parking brake mechanism engaged; and Fig. 4 shows the cam mechanism in Fig. 3 disengaged.

In Fig. 1 an embodiment of the invention is illustrated in which a parikng brake mechanism 1, conveniently mounted in a transmission 2, is operated by a control linkage 3, a shifter tube 4 rotatably mounted in a conventional steering column 6, and a manual selector lever 7. Preferably, when the manual selector 7 is in the park position, the brake mechanism 1 will engage and positively prevent rotation of a transmission output shaft 8 in either direction.

As best shown by Fig. 2, a locking member or gear 9, attached to the output shaft 8 by a key 11, is provided with a plurality of spaced external teeth 12, adapted to mesh with a tooth 13 on an adjacent locking element or pawl 14. This locking pawl is rotatably mounted on a fixed stub shaft 15, press fitted (see Fig. 3) into a bore 16 in a transmission case or housing 17. For continuously urging the pawl tooth 13 and the gear teeth 12 apart and for also preventing vibration of the pawl, a torsion spring 18, mounted on the shaft 15, is employed having one leg 19 held by a stop 21 on the transmission case 17 and another leg 22 bearing against the locking pawl 14.

The tooth side angles $a$ are not critical, the only concern being that the angle selected will cause a free separation under load. That is, any force tending to rotate the locking gear 9 relative to the locking pawl 14 will cause the tooth surfaces to slide and accordingly the engaged teeth to separate.

In the present invention the gear teeth 12 and pawl tooth 13 are held engaged by positive means, a cam device 23. This device 23 includes a control rod 24; a wedged-shaped cam 26, rotatably and slidably mounted on a reduced portion 27 of the control rod 24; and a compression spring 28, one end of which is affixed to the portion 27 for biasing the cam 26 against a shoulder 29 of the control rod 24. When the cam device 23 is actuated, the cam 26 will be moved until the surface substantially perpendicular to the direction of rotation of the pawl 14 is between a fixed abutment 31 on the case 17 and a pawl heel portion 32, conveniently near pawl tooth 13 to avoid stresses therebetween from leverage, thus moving the tooth 13 into engagement with the gear teeth 12. If the transmission output shaft 8 is stopped with the tooth 13 striking the top of one of the gear teeth 12, the compression spring 28 will be compressed as in Fig. 4. Because the spring 28 provides a constant yieldable force, an engagement of the pawl tooth 13 with the gear teeth 12 will result when the shaft 8 is moved slightly. With the cam device 23 a positive disengaging connection is provided when the shoulder 29 abuts the cam 26 and a yieldable engaging connection when the spring 28 is compressed.

A transmission shift lever 33, attached to a rotatably mounted detent shaft 34, actuates the cam device 23 through a conventional detent mechanism 36. This detent mechanism 36 includes a detent plate 37 fixed to detent shaft 34, and a ball and spring type detent 38, adapted to engage one of a plurality of notched recesses in the periphery of the detent plate 37. Whenever the detent plate 37 is rotated, motion is transferred therefrom by the control rod 24 to the cam 26. A notch 39, corresponding to the park position of the selector lever 7 and the engaged position of the cam device 23, is disposed at the extreme end of the plate 37 so that rotation by the selector lever 7 and accordingly the shift lever 33 to any other position will disengage the cam device 23.

The torsion spring 18 has another important function in addition to preventing vibration and urging the pawl tooth 13 and the gear teeth 12 apart. Namely, the spring 18 will assure disengagement of the teeth 12 and 13 whenever there is no load or force acting on these teeth. For example, this condition could occur when a vehicle is parked on a level surface without any tendency to With this type parking brake in which the accuracy of the gear teeth 12 and the pawl tooth 13 is not critical, the selector lever 7 can be moved easily out of the park position, although the output shaft 8 is under load, without the application of any additional force which would submit the interconnecting linkage and mechanism to excessive strains. This is an obvious advantage in a situation where the locking pawl is subjected to a heavy load, as when holding a vehicle parked on a hill. When desired, the selector lever can be moved from the park position with little effort because as soon as the cam device is released, the heavy load will thrust the teeth apart, thus encouraging disengagement.

We claim:

1. A parking brake mechanism for a transmission comprising, in combination, a transmission shaft, a toothed locking gear joined to said shaft, a toothed locking pawl provided with a heel portion and adapted for movement to and from an engaged position with respect to the locking gear so as to prevent rotation thereof, a fixed abutment adjacent the heel portion of the locking pawl, a control element, a cam slidably positioned on the control element, a spring for biasing the cam against a shoulder on the control element, and a transmission shift lever for moving the control element in one direction so as to cause the cam to be yieldably shifted to a wedging position between the heel of the pawl and the abutment thereby holding the locking pawl in the engaged position and in another direction so as to cause the cam to be forced by the engagement thereof with the shoulder on the control element from the wedging position.

2. In a parking brake mechanism for a transmission, the combination of a transmission shift, a toothed locking gear joined to said shaft, a toothed locking pawl provided with a heel portion and adapted for movement to and from an engaged position with respect to the locking gear so as to prevent rotation thereof, the locking gear and the locking pawl both having tooth side angles so disposed that the locking gear and the locking pawl tend to disengage under load, a fixed abutment adjacent the heel portion of said locking pawl, a shiftably mounted control element having a shoulder thereon, a wedge-shaped cam slidably positioned on the control element, a spring for biasing the cam against the control element shoulder, and a transmission shift lever for moving the control element in one direction so as to cause the cam to be yieldably shifted on the control element by the spring to a wedging position between the heel of the pawl and the abutment thereby holding the locking pawl in the engaged position and in another direction so as to cause the cam to be positively forced from the wedging position by the engagement of the control element shoulder with the cam.

3. In a parking brake mechanism for a transmission, the combination of a transmission casing, a transmission shaft journaled in the casing, a toothed locking gear joined to said shaft, a toothed pawl provided with a heel portion and supported by the casing for rotary movement to and from an engaged position with respect to said locking gear so as to prevent rotation thereof, the locking gear and the locking pawl both having tooth side angles so disposed that said locking gear and said locking pawl tend to disengage under load, a fixed abutment on the casing adjacent the heel portion of the locking pawl, a control rod arranged for shiftable movement by a transmission shift lever, and a cam slidably positioned on the rod, a spring for biasing the cam into engagement with a shoulder on the rod, the cam including a tapered surface and a surface substantially perpendicular to the direction of movement of said pawl, the control rod when shifted by the transmission shift lever in one direction causing the tapered surface on the cam initially and then finally the substantially perpendicular surface to be yieldably moved by the spring to the wedging position between the heel portion of the pawl and the abutment thereby holding the locking pawl in the engaged position and in another direction causing the shoulder on the control rod to engage the cam and force the cam from the wedging position.

References Cited in the file of this patent

UNITED STATES PATENTS

| | | |
|---|---|---|
| 1,852,935 | Morier | Apr. 5, 1932 |
| 1,977,588 | Matson | Oct. 16, 1934 |
| 2,653,689 | Hasbany | Sept. 29, 1953 |
| 2,670,064 | Hasbany | Feb. 23, 1954 |
| 2,689,029 | McFarland | Sept. 14, 1954 |
| 2,709,504 | Mamo | May 31, 1955 |
| 2,770,326 | Wayman | Nov. 13, 1956 |
| 2,792,716 | Christenson | May 21, 1957 |

UNITED STATES PATENT OFFICE
CERTIFICATE OF CORRECTION

March 3, 1959

Patent No. 2,875,856     Jerry R. Mrlik et al.

It is hereby certified that error appears in the printed specification of the above numbered patent requiring correction and that the said Letters Patent should read as corrected below.

Column 1, line 56, for "parikng" read -- parking --; column 2, line 55, after "tendency to" insert -- move.--.

Signed and sealed this 30th day of June 1959.

(SEAL)
Attest:
KARL H. AXLINE
Attesting Officer

ROBERT C. WATSON
Commissioner of Patents